United States Patent
Mischke et al.

(10) Patent No.: US 10,926,431 B2
(45) Date of Patent: Feb. 23, 2021

(54) TOOL HEAD AND GLASS OR GLASS CERAMIC ARTICLE PRODUCIBLE USING THE TOOL HEAD

(71) Applicant: Schott AG, Mainz (DE)

(72) Inventors: Stefan Mischke, Albig (DE); Thomas Werner, Bingen (DE); Marco Weisenburger, Undenheim (DE)

(73) Assignee: SCHOTT AG, Mainz (DE)

( * ) Notice: Subject to any disclaimer, the term of this patent is extended or adjusted under 35 U.S.C. 154(b) by 908 days.

(21) Appl. No.: 14/314,428

(22) Filed: Jun. 25, 2014

(65) Prior Publication Data
US 2014/0377505 A1     Dec. 25, 2014

(30) Foreign Application Priority Data

Jun. 25, 2013 (DE) .................. 10 2013 106 612

(51) Int. Cl.
*G02B 7/00* (2006.01)
*B28D 1/14* (2006.01)
(Continued)

(52) U.S. Cl.
CPC .............. *B28D 1/146* (2013.01); *B24D 7/14* (2013.01); *B28D 1/041* (2013.01); *B28D 1/186* (2013.01);
(Continued)

(58) Field of Classification Search
CPC ........ B28D 1/146; B28D 1/041; B28D 1/186; B24D 7/14; Y10T 428/24355; Y10T 428/24479
See application file for complete search history.

(56) References Cited

U.S. PATENT DOCUMENTS 3,343,308 A    9/1967 Fessel
3,453,041 A    7/1969 Rantsch
(Continued)

FOREIGN PATENT DOCUMENTS

DE    1890177    3/1964
DE    2103919    9/1971
(Continued)

OTHER PUBLICATIONS

German Office Action dated Apr. 15, 2014 corresponding to German Patent No. 10 2013 106 612.7 (English translation), 8 pp.
(Continued)

*Primary Examiner* — Nathan L Van Sell
(74) *Attorney, Agent, or Firm* — Ohlandt, Greeley, Ruggiero & Perle, L.L.P.

(57) ABSTRACT

A tool head capable of introducing deep recesses into hard and brittle material such as glass and glass ceramics is provided. The tool head includes a hollow cylindrical abrasive body merging into a hollow shank. The hollow cylindrical abrasive body has an end face with a central abrasive area at the location of a cylinder axis. The central abrasive area is connected with the inner wall surface of the hollow cylindrical abrasive body by at least one web. The end face of the abrasive body, the web, and at least a portion of the outer wall surface of the abrasive body are covered with abrasive. The hollow shank has at least one opening to the interior between the at least one web and the inner wall surface of the abrasive body.

18 Claims, 5 Drawing Sheets

(51) Int. Cl.
    *B28D 1/18*    (2006.01)
    *B28D 1/04*    (2006.01)
    *B24D 7/14*    (2006.01)

(52) U.S. Cl.
    CPC ......... *G02B 7/00* (2013.01); *Y10T 428/24355* (2015.01); *Y10T 428/24479* (2015.01)

(56) References Cited

U.S. PATENT DOCUMENTS

| | | | |
|---|---|---|---|
| 3,490,405 | A | 1/1970 | Reader |
| 3,514,275 | A | 5/1970 | Bray |
| 3,600,257 | A | 8/1971 | Reinhardt |
| 3,613,222 | A | 10/1971 | Richey |
| 3,644,022 | A | 2/1972 | Jagdt |
| 3,753,322 | A | 8/1973 | Bordes |
| 3,754,812 | A | 8/1973 | Mohn |
| 3,912,380 | A | 10/1975 | Klein |
| 4,331,383 | A | 5/1982 | Christiansen |
| 4,349,329 | A | 9/1982 | Naito |
| 4,383,785 | A * | 5/1983 | Rice ............ B23B 51/02 125/20 |
| 4,466,700 | A | 8/1984 | Christiansen |
| 4,799,949 | A | 1/1989 | Keck |
| 4,842,398 | A | 6/1989 | Ducassou |
| 4,902,216 | A | 2/1990 | Cunningham |
| 4,911,743 | A * | 3/1990 | Bagby ............ C03B 27/00 65/30.13 |
| 5,076,700 | A * | 12/1991 | DeCaprio ............ G02B 7/182 359/846 |
| 5,137,098 | A | 8/1992 | Raffaelli |
| 5,252,009 | A | 10/1993 | Bossler |
| 5,443,884 | A | 8/1995 | Lusignea |
| 5,825,565 | A | 10/1998 | Papenburg |
| 6,520,653 | B1 | 2/2003 | Lang |
| 6,886,951 | B2 | 5/2005 | Bennett |
| 7,080,915 | B2 | 7/2006 | Tsuno |
| 8,034,299 | B2 | 10/2011 | Ido |
| 8,911,098 | B2 | 12/2014 | Schaeffer |
| 2003/0165662 | A1 | 9/2003 | Suwabe |
| 2004/0131512 | A1 | 7/2004 | Abe |
| 2007/0246156 | A1 | 10/2007 | Kohlmann |
| 2009/0197040 | A1 | 8/2009 | Hanada |
| 2010/0103546 | A1 | 4/2010 | Schaefer |
| 2010/0182711 | A1 * | 7/2010 | Westerhoff ............ G02B 1/00 359/883 |
| 2012/0182636 | A1 | 7/2012 | Seibert |

FOREIGN PATENT DOCUMENTS

| | | |
|---|---|---|
| DE | 2929714 | 1/1981 |
| DE | 3534426 A1 | 8/1986 |
| DE | 29519102 U1 | 1/1996 |
| DE | 19626364 | 1/1998 |
| DE | 102006006445 A1 | 8/2007 |
| EP | 0006417 A1 | 1/1980 |
| EP | 0395257 | 4/1990 |
| EP | 0630864 A2 | 12/1994 |
| EP | 1890177 | 2/2008 |
| EP | 2489488 A1 | 8/2012 |
| FR | 2609179 | 12/1986 |
| JP | 50003655 | 2/1975 |
| JP | S6239805 | 2/1987 |
| JP | H052102 | 1/1993 |
| JP | H05245827 | 9/1993 |
| JP | H0772314 | 3/1995 |
| JP | H0894813 | 4/1996 |
| JP | 2000147223 | 5/2000 |
| JP | 2002182018 | 6/2002 |
| JP | 2003020238 A | 1/2003 |
| JP | 2003185811 | 7/2003 |
| JP | 2004163803 | 6/2004 |
| JP | 2005199619 | 7/2005 |
| JP | 2005234344 | 9/2005 |
| JP | 2012162449 | 8/2012 |
| WO | 9212837 A1 | 8/1992 |
| WO | 2006034775 | 4/2006 |

OTHER PUBLICATIONS

European Search Report dated Nov. 11, 2014 corresponding to European Patent Application No. 14173806.2 with English translation, 10 pages.

Manufacturing of lightweighted Zerodour components at Schott, Dohring et al., 2007, Proc. of SPIE vol. 6666.

* cited by examiner

TOOL HEAD AND GLASS OR GLASS CERAMIC ARTICLE PRODUCIBLE USING THE TOOL HEAD

CROSS REFERENCE TO RELATED APPLICATIONS

This application claims benefit under 35 U.S.C. § 119(a) of German Patent Application No. 10 2013 106 612.7, filed Jun. 25, 2013, the entire contents of which are incorporated herein by reference.

BACKGROUND OF THE INVENTION

1. Field of the Invention

The invention generally relates to rotary material removing tools. More particularly, the invention relates to a rotary machining tool head, especially for introducing recesses into glass or glass ceramics.

2. Description of the Related Art

From DE 35 34 426 C1 a drilling device is known for drilling plates susceptible to breaking, in particular glass plates. The plate to be drilled is fixed by a support and a holding down member. Support and holding down member are formed by inner rings of ball joint bearings in order to prevent bending stresses when fixing the glass plate. A hole is produced using two counteracting hollow drills that are movable towards each other.

Further, EP 2 489 488 A1 describes a diamond core drill bit with center drill and abutment. The diamond core drill bit includes a crown- or cup-like milling tool having an edge that extends in a working plane and is provided with material removing means. A drill is arranged at the rotation axis of the milling tool, the drill having a tip that extends beyond the working plane for drilling a center hole, and a shank connected to a holder. The shank of the drill has associated therewith an abutment which is overtopped by the edge for some extent and which will abut against the workpiece once a pilot circuit has been milled with the material removing means of the edge, in order to prevent the pilot circuit from being deepened unless the drill has been separated from the holder.

Both devices mentioned above are suitable for producing through holes of small depth in glass plates.

From EP 06417 A1, a carbide tipped drill is known, that is allegedly suitable for drilling very different materials such as metals, glass, ceramics, and concrete. The drill has a cemented carbide cutting edge with a tip angle from 120° to 125° and a clearance angle from 10° to 15°. However, with a drill of this type with material removing operation there is a risk of crack formation in case of hard and brittle materials such as glass or glass ceramics. Even if no macroscopic cracks remain in the workpiece, microcracks might be introduced which have a strong strength-reducing effect on the material. Moreover, the drill is only suitable for introducing bores, but not for milling.

U.S. Pat. No. 3,343,308 A discloses a cutting and grinding device for the construction industry, in which spaced apart abrasive bodies are fixedly attached to a tool and to each other using a ductile wire. In one embodiment, a non-coring drill is provided in which one or more abrasive bodies are fixed across the open end of a core drill.

Further, a diamond tool for drilling and milling is known from U.S. Pat. No. 5,137,098 A. According to one embodiment, a semicircular axially protruding projection is provided, extending around the rotation axis and being covered by a layer of abrasives. A plurality of such projections may also be provided.

It has not been possible so far to produce blind holes with diameters and depths that have to be ground using tools with a ratio of tool shank diameter to tool length of smaller than 1:10 in glass ceramics and with a still acceptable reduction in material strength, because of instability of the tool shanks. The diameter of the tool shank in turn significantly depends on the diameter of the tool head.

SUMMARY

The invention is therefore based on the object to provide a tool which permits to introduce even deep holes and milled recesses into hard and brittle materials, especially glass and glass ceramics, without risk of breakage. This object is achieved by the subject matter of the independent claims. Advantageous embodiments and modifications of the invention are specified in the dependent claims.

Accordingly, the invention provides a tool head for drilling and milling of recesses into hard and brittle materials, the tool head comprising a hollow cylindrical abrasive body that merges into a preferably hollow shank, wherein a central abrasive area is arranged at an end face of the hollow cylindrical abrasive body at the location of a cylinder axis of the abrasive body, which central abrasive area is connected to the inner wall surface of the hollow cylindrical abrasive body by at least one web or leg.

The end face of the abrasive body, the web with the central abrasive area and at least a portion of the outer wall surface of the abrasive body are covered with abrasive. Between the at least one web and the inner wall surface of the abrasive body there is remaining at least one opening to the interior of the abrasive body, preferably also to the interior of the hollow shank. The web may also be referred to as a spoke.

Accordingly, material removal by means of the tool head is accomplished by grinding which may be referred to as cutting or abrasion with geometrically undefined cutting edge (due to the arrangement and shape of the abrasive grits).

This configuration allows to maximize the diameter of the tool head relative to the cross-sectional area of the recess to be introduced. When milling the recess, the lateral movement of the tool head rotating around its cylinder axis does no longer have to go beyond the central axis of the recess in order to completely remove the material across the cross section of the recess. Rather, the web and the central abrasive area ensure that even with an only slight lateral movement of the tool head material is abraded from the whole surface area swept by the tool head.

Although the peripheral speed of the abrasive area in the center of the tool or at the cylinder axis is equal to zero, the tool head, surprisingly, is very well suited to be used even for drilling recesses, i.e. without any lateral movement of the tool head. In this case, the inventive design of the tool head additionally causes less knocking and less vibration of the head, so that very smooth walls are produced.

Due to the rotary cylindrical basic shape, the cross section of a recess producible with the tool will have a minimum radius which cannot be smaller due to the finite diameter of the abrasive body.

Regardless of whether a recess is drilled or milled, it is now possible to introduce recesses into hard and brittle materials, such as in particular glass and glass ceramics, that are very deep relative to the minimum radius of the lateral wall and thus indirectly also relative to the cross-sectional dimension. Accordingly, the invention also relates to a glass or glass ceramic element which is producible by machining using a tool head according to the invention. The glass or glass ceramic element has at least one ground-in recess which extends rectilinearly from an open end at a surface of the glass or glass ceramic element to a bottom. The lateral wall surface of the recess has a minimum radius of at least 6 millimeters, and a ratio of the depth of the recess to the minimum radius thereof is greater than 10:1. Here, a recess refers to a cavity closed at one end, that is to say not a through opening. In other words, the recess is closed by a bottom in the hard and brittle material.

In the special case of a recess with a circular cross section, the depth of the recess is at least five times, preferably at least ten times as great as the diameter thereof.

The invention permits to produce light-weight glass ceramics structures, for example. The particularly smooth running of the tool head according to the invention even allows for very thin-walled structures. Specifically, the minimum distance between the wall surface of the recess and a surface of the glass or glass ceramic element may be not more than 15 mm, preferably not more than 10 millimeters. The surface may even be the wall of a neighboring recess. Therefore, according to a modification of the invention, a glass or glass ceramic element is provided which comprises a plurality of ground-in recesses that extend side by side, wherein the minimum distance between the wall surfaces of two adjacent recesses is not more than 15 mm, preferably not more than 10 millimeters.

One possible application are light-weight glass ceramic mirror supports for telescopes, for example.

BRIEF DESCRIPTION OF THE DRAWINGS

The invention will now be explained in more detail by way of exemplary embodiments and with reference to the accompanying drawings. In the drawings the same reference numerals designate the same or equivalent elements. In the drawings.

DETAILED DESCRIPTION

Figure 1:
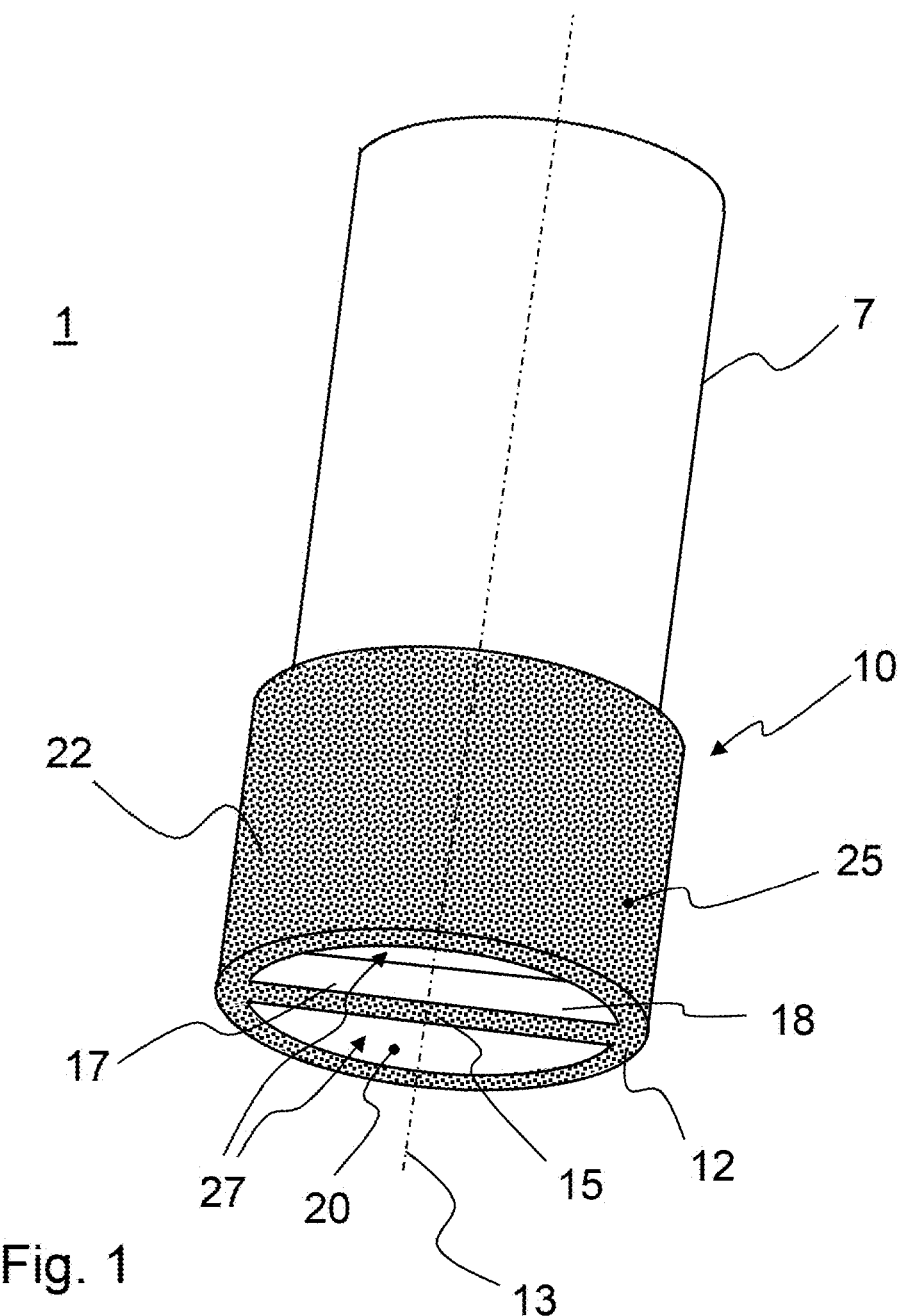
FIG. 1 is a schematic view of a tool head.

FIG. 1 shows a perspective view of an exemplary embodiment of a tool head 1 according to the invention.

Tool head 1 comprises an abrasive body 10 which has the basic shape of a hollow cylinder. Abrasive body 10 merges into a shank 7. That means, the abrasive body 10 may be attached to the shank, or shank and abrasive body 10 are integrally formed, for example turned from a tube of a suitable diameter. Shank 7 also has the shape of a hollow cylinder. Without being limited to the specific embodiment shown in FIG. 1, shank 7 preferably has a smaller diameter than abrasive body 10, in order to facilitate the milling and/or drilling of recesses of a depth greater than the axial length of the abrasive body 10. Generally, without being limited to the specific example shown in FIG. 1, the abrasive body 10 is integrally formed according to one embodiment, in particular as a molded body. To this end, abrasive body 10 including the one or more web(s) may be milled from a metal body, for example, or may be produced in a casting process. Furthermore, it is possible that the webs are welded to a hollow cylindrical base body of the abrasive body.

The shank serves to clamp the tool head in the chuck of a drilling and/or milling device. Recesses are then introduced by rotating the tool head 1 around its cylinder axis 13 and axially and/or radially advancing tool head 1.

The abrasive body 10 is covered with an abrasive 25 which causes the removal of material when introducing a recess into a hard and brittle material. The surfaces of the abrasive body provided with abrasive 25 are marked with a dotted shading.

As can be seen from FIG. 1, abrasive 25 is also provided in the center of the tool, or at the location of cylinder axis 13. To this end, two webs 17, 18 are provided in this embodiment, which extend from opposite locations at the inner wall surface 20 of abrasive body 10 and meet at the location of cylinder axis 13 and which are covered with abrasives 25. In this manner, a central abrasive area 15 is defined at and around the area of cylinder axis 13 at the end face 12 of the abrasive body. The specific configuration of the illustrated example may also be interpreted as a single web 17 extending through the center of the tool or the intersection point of the imaginary cylinder axis with the plane of end face 12. Accordingly, a central abrasive area 15 is arranged at the location of cylinder axis 13 of abrasive body 10, which is connected by at least one web 17, 18 to the inner wall surface 20 of hollow cylindrical abrasive body 10. The end face 12 of abrasive body 10, the one or more web(s) 17, 18 with central abrasive area 15, and at least a portion of the outer wall surface 22 of abrasive body 10 are covered with abrasive 25.

Without being limited to the specific example illustrated, the at least one web is preferably covered with abrasive throughout its radial extension, in particular with abrasive grits. That means, it is preferred to not just provide individual, radially spaced grinding tools or grinding elements on the one or more webs. A continuous coating with abrasive on the one or more webs 17, 18, as shown in FIG. 1 and as it is generally preferred provides for a high material removal rate on the one hand, and at the same time for smooth running of the tool head. It is particularly preferred that the central abrasive area and the end face of the hollow cylindrical basic body are likewise continuously covered with abrasive, which means the entire end face.

The smooth running achieved by virtue of the geometry of tool head 1 makes it possible to use very long tools. According to one embodiment of the invention it is therefore contemplated that the diameter of shank 7 is not more than 1:10, preferably not more than 1:15 of the length of the tool head measured from end face 12 of abrasive body 10 until the end of shank 7. According to yet another embodiment of the invention, the length of the tool head 1 as defined above is more than 60 mm, preferably more than 120 mm. Optionally, a multi-part shank 7 may be provided, with abutted axial shank portions in order to obtain a long tool head 1 for drilling or milling deep recesses.

The abrasive 25 on the outer wall surface 22 provides for removal of material when radially advancing the tool head, the abrasive 25 on the end face and the webs 17, 18 which as well form the central abrasive area 15 provides for removal of material when axially advancing the tool head.

Generally, without being limited to the illustrated exemplary embodiment, at least one opening 27 to the interior of abrasive body 10 and hollow shank 7 remains between webs 17, 18 and the inner wall surface 20 of abrasive body 10. In the embodiment shown in FIG. 1, two openings 27 are defined due to the webs 17, 18 joint to each other, or the continuous web.

Because of the at least one opening, the end face is not closed. Opening 27 in particular serves to receive removed material, and optionally to supply coolant and/or lubricant.

Preferably, without being limited to the particular embodiment of FIG. 1, the end face 12 of the hollow cylinder of the abrasive body and the other abrasive elements at the end face are arranged in a single plane. This makes it possible, inter alia, to produce recesses with a flat bottom. Moreover, such a planar configuration has proved suitable to prevent vibrations of the tool head 1. Therefore, according to one embodiment of the invention, without being limited to the exemplary embodiment of FIG. 1, it is contemplated that the central abrasive area 15 and the at least one web 17, 18 are at the same level as the end face 12, so that the end face 12, the at least one web 17, 18, 19, and the central abrasive area 15 form an abrasive surface in a plane defined by end face 12 and interrupted by the at least one opening 27.

Generally, the abrasive 25 particularly preferably comprises abrasive grits, preferably diamond abrasive grits, which are embedded in a matrix. Besides diamond, for example corundum, silicon carbide, or another hard material is conceivable as an abrasive.

Also, particularly preferred are abrasive grits sintered into a metal matrix. A metal matrix with embedded abrasive grits may also be produced by galvanic deposition. A metal matrix is preferred because of the good heat dissipation into the abrasive body 10. A plastic matrix or a ceramic including abrasives would optionally also be conceivable.

Figure 2:
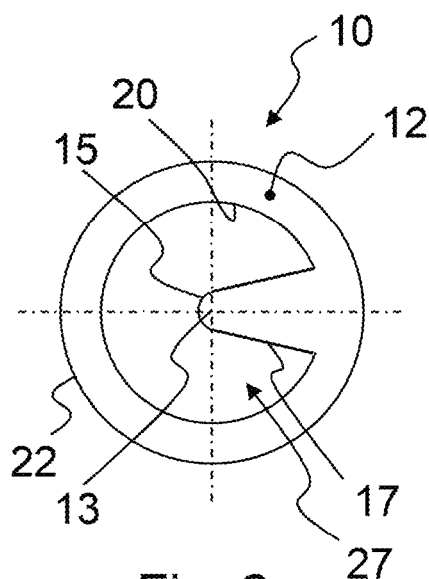
FIGS. 2 to 4 are plan views of the end face of the tool head.
Figure 3:
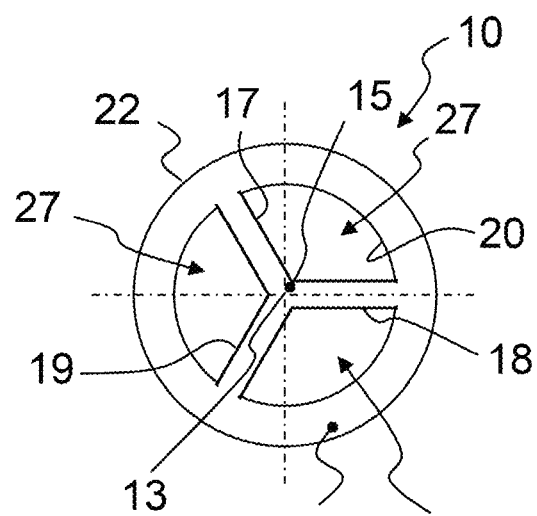
Figure 4:
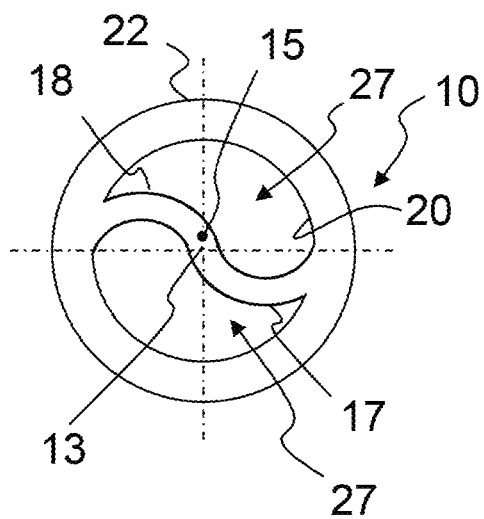

FIGS. 2 to 4 are plan views of the end face of abrasive body 10, illustrating several other embodiments of the arrangement and configuration of webs.

In the exemplary embodiment shown in FIG. 2, a single web 17 is connected to the inner wall surface 20 of abrasive body 10 at one end thereof. The free end of web 17 forms a central abrasive area 15 at the location of cylinder axis 13 and the area surrounding cylinder axis 13. Accordingly, only a single opening 27 is provided.

The embodiment of FIG. 3 is particularly preferred. Here, three webs 17, 18, 19 are provided which extend from inner wall surface 20 and meet in the center of the tool. The region at which webs 17, 18, 19 meet forms the central abrasive area 15 at cylinder axis 13 and surrounding cylinder axis 13. Accordingly, there are three openings 27 resulting in this embodiment, between webs 17, 18, 19 and inner wall surface 20. The configuration with three webs 17, 18, 19 is particularly preferred in terms of mechanical stability. There may as well be more than three webs, for example four, five, or six webs, or spokes. On the other hand this would increase production costs and the total area of openings 27 would be reduced.

FIG. 4 shows a variation of the configuration with two webs 17, 18 shown in FIG. 1. In contrast to the embodiment shown in FIG. 1, the two spokes or webs 17, 18 are formed with a curved shape in the example shown in FIG. 4.

For mechanical stability it is generally favorable to provide a plurality of webs 17, 18, 19, which are arranged in rotationally symmetric manner with respect to the cylinder axis 13 of abrasive body 10 for connecting the central abrasive area 15 with the inner wall surface 20 of hollow cylindrical abrasive body 10. This is the case in the embodiments of FIG. 1, FIG. 3, and FIG. 4.

It is generally preferred that the total surface area of the one or more web(s) 17, 18, 19 and the central abrasive area 15 together is less than the total area of the one or more opening(s) 27 interrupting the abrasive face. This turns out to be advantageous for smooth running and to prevent vibrations of tool head 1. The aforementioned condition is satisfied in all the exemplary embodiments of FIGS. 1 to 4.

Figure 5:
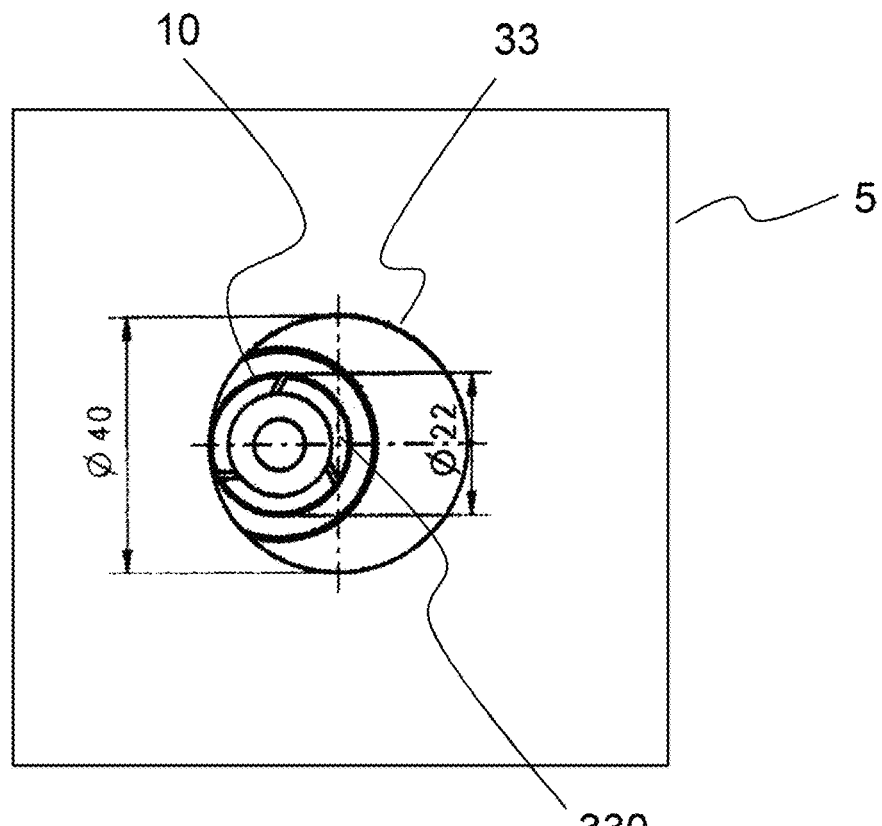
FIGS. 5 and 6 are plan views of a recess while the recess is being produced using a tool head.
Figure 6:
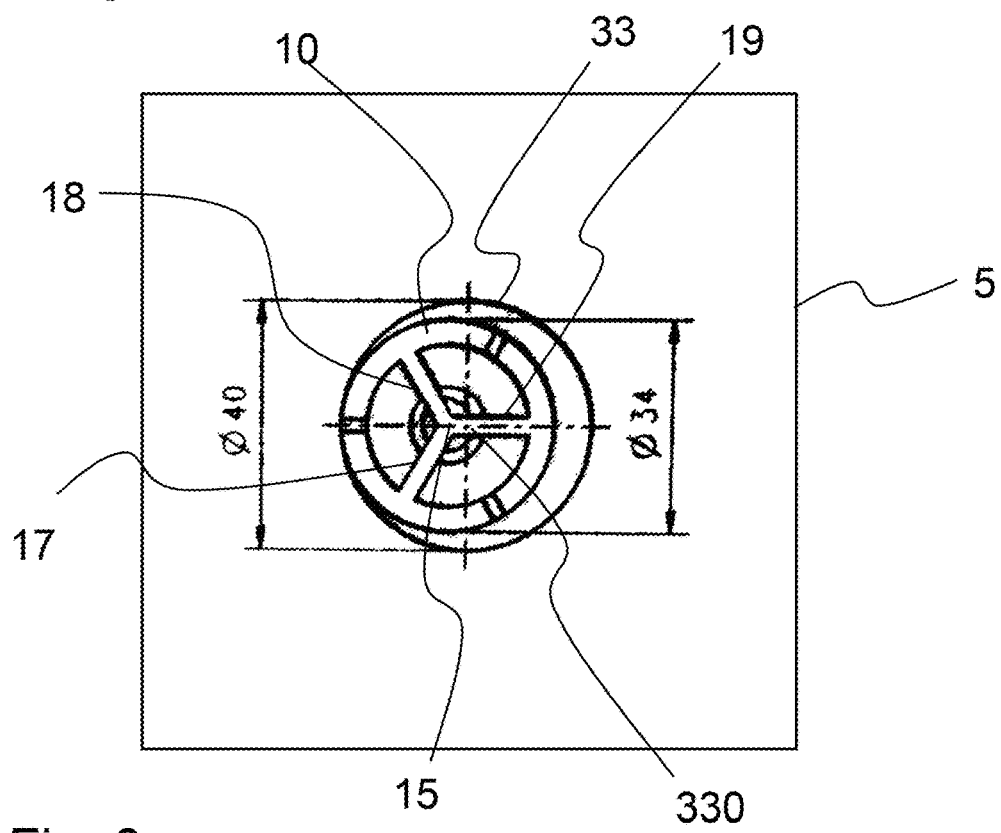

Referring to FIGS. 5 and 6, it will be explained why a tool head 1 according to the invention permits to introduce recesses that are very deep in relation to their cross-sectional area and have very smooth walls, into hard and brittle materials such as in particular glass or glass ceramics.

FIG. 5 shows a plan view of a recess 33 in a hard and brittle material 5 while the recess is being produced using a tool head 1. The tool head shown in FIG. 5 is a conventional tool with an annular head. In order to introduce a recess of circular cross section having a diameter of 40 millimeters, such as in the example shown, the diameter of tool head 1 is 22 millimeters. The diameter cannot be chosen larger, since otherwise material would remain in the center 330 of recess 33, which might break out at an effective length or might stop the axial advance of tool head 1. This example shows that the diameter of the tool head must always be much smaller than the diameter or, more generally, the cross-sectional dimension of the recess. However, in case of a great depth of the recess this quickly leads to instabilities of the tool, so that it is not possible to produce smooth walls.

For comparison, FIG. 6 shows a tool head 1 of the invention while introducing a recess 33 of the same dimensions. By way of example, tool head 1 is of the configuration as shown in FIG. 3, having three ribs 17, 18, 19 arranged in rotationally symmetrical manner. Due to the abrasive provided at the webs and at the central abrasive area 15, the center 330 of recess 33 is processed even when the outer rim or the end face 12 of the hollow cylindrical abrasive body always rests away from center 330. Therefore, it is possible to use an abrasive body 10 with a larger diameter in relation to the cross-sectional area of recess 33. In the example shown, abrasive body 10 has a diameter of 34 millimeters. Thus, for the same transverse dimension of recess 33, a larger abrasive body 10 can be used, when compared to a tool as shown in FIG. 5, which significantly improves smooth running of tool head 1. The deeper a recess is introduced, the more critical is smooth running.

The minimum diameter of a recess 33 is of course dependent on the diameter of tool head 1. Without being limited to the exemplary embodiments shown in the figures, an abrasive body 10 is preferred that has a diameter of at least 5 millimeters. Particularly suitable are diameters of the abrasive body 10 from 5 to 60 millimeters.

In this manner, the invention permits to produce novel glass and glass ceramic articles. The method of the invention for processing a glass or glass ceramic article is based on the steps of providing a glass or glass ceramic element; and grinding therein a recess using a tool head according to the invention, which preferably has a radius of at least 6 millimeters, the recess preferably extending rectilinearly into the glass or glass ceramic element from an open end at the surface of the glass or glass ceramic element, by driving the tool head 1 to rotate around its cylinder axis; and while being rotated, axially advancing the tool head into the glass or glass ceramic element, incrementally or continuously, thereby removing the material of the glass or glass ceramic element by means of the abrasive body of the tool head. The resulting abraded material may be removed through the hollow abrasive body 10, in particular using a cooling fluid supplied through the hollow shank.

Elements made of glass or glass ceramic material with low thermal expansion are processed particularly preferably. Low expansion glass ceramics that can be used in particular include lithium aluminosilicate glass ceramics. For example, suitable glass ceramics are available under the name of Zerodur® from Schott AG, or under the name of Clearceram® from Ohara Inc. According to one embodiment of the invention, the composition of preferred low expansion glass ceramic elements comprises components $Li_2O$, $Al_2O_3$, and $SiO_2$ in the following amounts, in percent by weight (on oxide basis):

$Li_2O$: 2-5.5 wt %
$Al_2O_3$: 17-32 wt %
$SiO_2$: 50-70 wt %, preferably at most 62 wt %
$P_2O_5$: 3-12 wt %
$ZrO_2$: 0-5 wt %, preferably at least 1 wt %
$TiO_2$: 1-5 wt %.

Another suitable low expansion material is titanium-doped quartz glass. Such a glass is available, for example, under the name of ULE® from Corning Incorporated.

A glass or glass ceramic material of low thermal expansion in particular refers to a material exhibiting a median coefficient of thermal expansion, e.g. specified for a temperature interval from 0° C. to 50° C. ("Coefficient of Thermal Expansion" CTE(0;50)) in a range from 0±100 ppb/K, preferably in a range from 0±50 ppb/K, more preferably in a range from 0±20 ppb/K, most preferably in a range from 0±10 ppb/K.

Figure 7:
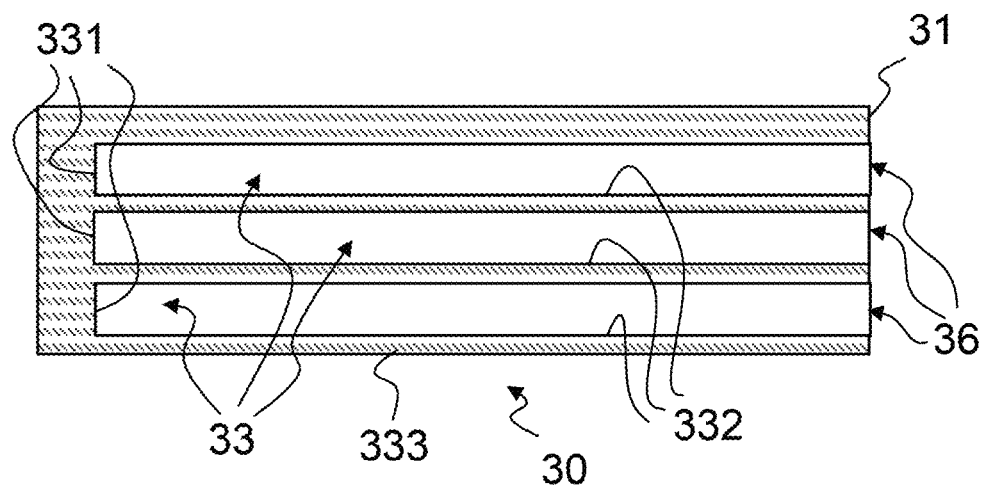
FIG. 7 is a cross-sectional view of a glass or glass ceramic element.

FIG. 7 shows a schematic cross section through such a glass or glass ceramic element 30 that can be produced by processing using a tool head 1 according to the invention. Glass or glass ceramic element 30 has at least one ground-in recess 33. In the example shown in FIG. 7, a plurality of recesses 33 have been introduced, here specifically three, which extend in parallel to each other. Further, recesses 33 extend rectilinearly from their open end 36 at surface 31 of the glass or glass ceramic element 30 to bottom 331 of the respective recess 33.

Recesses 33 have a ratio of depth or length of the recess 33 to a minimum radius thereof of greater than 10:1. In case of a circular cross section of the recess 33, without limitation to the illustrated exemplary embodiment, this will generally result in a ratio of the depth of recess 33, i.e. its longitudinal dimension as measured from open end 36 to bottom 331, to the diameter of at least 10:1. In the example shown in FIG. 7, this ratio is about 15:1, which is identifiable from the length and height of recesses 33.

According to another exemplary embodiment, a recess of a depth of 320 millimeters was produced in a glass ceramic using a tool head with a diameter of 34 millimeters. Thus, the ratio of the depth to the minimum radius of the cross-sectional area is 18.8:1. In case of a circular cross section, the ratio of depth to diameter is 9.4:1. Such recesses are easily produced with the tool head 1 according to the invention.

As already mentioned above, tool head 1 is distinguished by smooth running which in turn allows to obtain very smooth walls. Without being limited to the exemplary embodiments, it is contemplated according to one embodiment of the invention that the mean roughness of the lateral wall surface 332 of recess 33 has a value of $R_a$ of smaller than 6 µm. If, for example, the recess in the glass or glass ceramic material is stepped from an incremental advancement of the tool head and milling a range in height, the above value is true for surface areas except for the steps. Even an average roughness from 0.1 µm to 5 µm may be achieved. Typical values are in a range from 0.5 to 3.5 µm. Therefore, the roughness is preferably not more than 5 µm, more preferably not more than 3.5 µm.

The smoothest walls may be produced when drilling recesses 33. In contrast to milling, during drilling the tool head 1 is only axially advanced into the glass or glass ceramic material. Generally it is surprising here that the central abrasive area 15 allows for drilling within an appropriate time at all, as the circumferential speed of the abrasive 25 at the location of the cylinder axis is equal to zero.

As likewise schematically illustrated by the example of FIG. 7, even very thin-walled structures may be produced in glass or glass ceramics, since due to the smooth running of tool head 1 damage can be avoided when introducing recess 33, in particular cracks in wall surface 332. Also, drifting of tool head 1 is avoided. Therefore, the minimum distance between the wall surface 332 of a recess 33 and a surface of the glass or glass ceramic element 30 may be not more than 15 mm, preferably not more than 10 mm. This distance may for example be the distance to an external surface of the glass or glass ceramic element 30, such as e.g. the distance from the wall surface 332 of the lowermost recess 33 in FIG. 7 to the lateral surface 333 of the glass or glass ceramic element 30.

Thin walls may also be produced between two adjacent recesses 33, which is likewise schematically illustrated FIG. 7 by way of example. According to one embodiment of the invention, without being limited to the exemplary embodiment, it is therefore contemplated that a plurality of recesses 33 are provided, which preferably extend side by side, wherein a minimum distance between the wall surfaces 332 of two adjacent recesses is not more than 15 millimeters, preferably not more than 10 millimeters. In a practical exemplary embodiment, a wall thickness of merely 5 millimeters was verified in a ZERODUR glass ceramic block, with a depth of the recesses 33 of 320 millimeters.

Due to the preferred design of the end face of tool head 1, according to which the central abrasive area 15, the end face of the hollow cylindrical portion of the abrasive body and the abrasive areas at the one or more web(s) are in a single plane, the recess 33 preferably has a flat bottom 331, as in the illustrated example.

Figure 8:
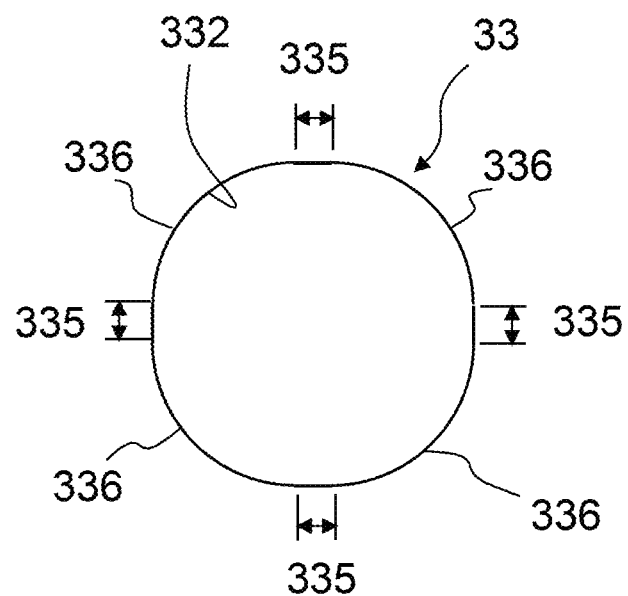
FIG. 8 illustrates the cross-sectional shape of a recess.

FIG. 8 shows an exemplary embodiment of a typical cross-sectional shape of a recess 33. The cross section has the shape of a square or rectangle with rounded corners.

Wall surface 332 of recess 33 comprises short rectilinear wall sections 335 which are interconnected by circularly curved wall sections 336. In a practical exemplary embodiment, a recess 33 was produced with a radius of the curved wall sections 336 of 19 millimeters and rectilinear wall sections of a width of 5 millimeters. This cross-sectional shape corresponds to the shape in FIG. 8. With a depth of the recess 33 of 320 millimeters, a resulting ratio of depth to minimum radius is 320/19=16.8.

Figure 9:
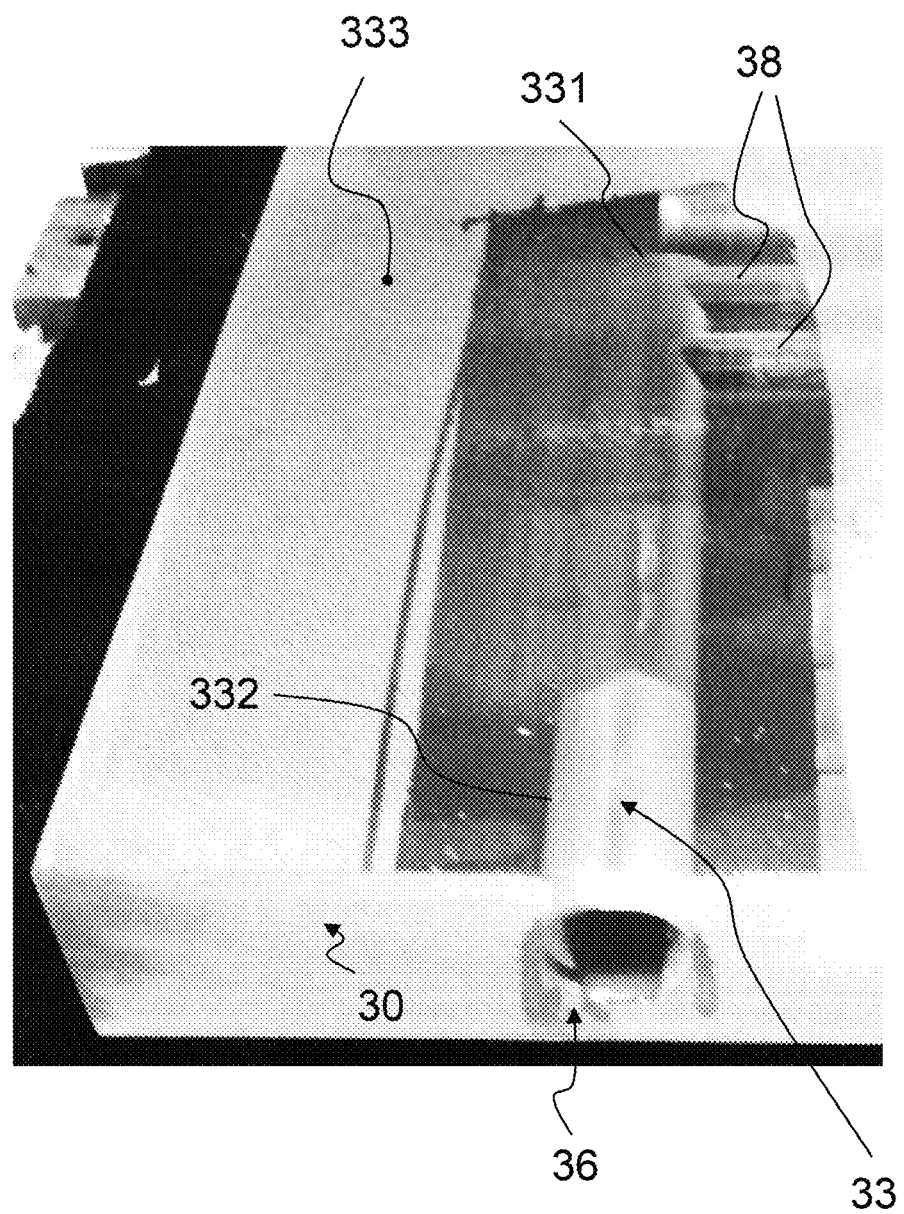
FIG. 9 is a photograph of a glass ceramic block including a recess.

FIG. 9 shows a photograph of an inventive glass or glass ceramic element 30. Specifically, this is a ZERODUR glass ceramic block. A recess 33 has been introduced into this block. In order to make the recess 33 visible in the glass ceramic block, lateral surface 333 has been coated with oil in the region of recess 33.

The surface region provided with oil is now clearly translucent. Recess 33 has a cross sectional shape corresponding to the exemplary embodiment shown in FIG. 8. At the end of recess 33 near bottom 331, two lateral channels 38 were introduced. These lateral channels 38 were likewise introduced using the tool head according to the invention, specifically not by milling, but by drilling.

Accordingly, it is generally also possible to produce intercommunicating recesses which meet in the interior of the glass or glass ceramic element.

The invention is not only limited to the exemplary embodiments of the invention, rather it may be varied in many ways within the scope of the subject matter of the appended claims. In particular, features of individual exemplary embodiments may be combined. The invention will find application, inter alia, for producing light-weight stable supports, in particular from glass or glass ceramics. Such supports may be used in semiconductor manufacturing for the exposure of semiconductor wafers, or as a mirror support for telescopes. Accordingly, the invention also relates to a support, in particular a glass or glass ceramic support including at least one recess according to the invention.

LIST OF REFERENCE NUMERALS

1 Tool head
3 Recess
5 Hard and brittle material
7 Shank
10 Hollow cylindrical abrasive body
12 End face
13 Cylinder axis
15 Central abrasive area
17, 18, 19 Web
20 Inner wall surface of 10
22 Outer wall surface
25 Abrasive
27 Opening
30 Glass or glass ceramic element
31 Surface of 30
33 Recess
36 Open end of 33
38 Lateral channel
331 Bottom
330 Center of 33
332 Wall surface of 33
333 Lateral surface of 30
335 Rectilinear wall section of 332
336 Curved wall section of 332

What is claimed is:

1. A glass or glass ceramic element, comprising:
   a block of glass or glass ceramic having a top surface and a bottom surface; and
   a blind hole ground into the block of glass or glass ceramic rectilinearly from the top surface to a location near the bottom surface to define an open end at the top surface and a closed end in an interior of the block of glass or glass ceramic near the bottom surface,
   wherein the blind hole has a depth that is at least five times as great as a diameter thereof, and
   wherein the blind hole has a lateral wall surface with a minimum radius of at least 6 millimeters.

2. The glass or glass ceramic element as in claim 1, wherein the block of glass or glass ceramic is configured as a mirror support for telescopes.

3. The glass or glass ceramic element as in claim 1, wherein the block of glass or glass ceramic is configured as semiconductor manufacturing support.

4. The glass or glass ceramic element as in claim 1, wherein the blind hole has a ratio of the depth of the blind hole to the minimum radius is greater than 10:1.

5. The glass or glass ceramic element as in claim 1, wherein the closed end of the blind hole has a planar bottom.

6. The glass or glass ceramic element as in claim 1, wherein the lateral wall surface has a mean roughness value of smaller than 6 µm.

7. The glass or glass ceramic element as in claim 1, further comprising a plurality of blind holes that extend side-by-side and having a minimum distance between wall surfaces of adjacent blind holes that is not more than 15 mm.

8. The glass or glass ceramic element as in claim 7, wherein the minimum distance is not more than 10 millimeters.

9. The glass or glass ceramic element as in claim 1, wherein the blind hole has a cross-sectional along a longitudinal extension defined from the top surface to the bottom surface that is uniform.

10. The glass or glass ceramic element as in claim 1, wherein the blind hole has a cross section along a longitudinal extension defined from the top surface to the bottom surface that is circular.

11. The glass or glass ceramic element as in claim 1, wherein the blind hole has a cross section along a longitudinal extension defined from the top surface to the bottom surface that is square or rectangular with rounded corners.

12. The glass or glass ceramic element as in claim 1, wherein the blind hole has a cross section along a longitudinal extension defined from the top surface to the bottom surface that comprises rectilinear wall sections interconnected by circularly curved wall sections.

13. The glass or glass ceramic element as in claim 1, wherein the depth is at least ten times as great as the diameter.

14. The glass or glass ceramic element as in claim 1, wherein the block of glass or glass ceramic has an outer surface, the lateral wall surface has a minimum distance to the outer surface that is not more than 15 mm.

15. The glass or glass ceramic element as in claim 14, wherein the minimum distance is not more than 10 millimeters.

16. The glass or glass ceramic element as in claim 1, wherein the lateral wall surface and the closed end of the blind hole are ground surfaces.

17. The glass or glass ceramic element as in claim 1, further comprising:
   a second blind hole ground into the block of glass or glass ceramic rectilinearly from the top surface to a second closed end in the interior of the block of glass or glass ceramic near the bottom surface; and
   a lateral channel ground into the block of glass or glass ceramic from the blind hole to the second blind hole in the interior of the block of glass or glass ceramic near the bottom surface.

18. The glass or glass ceramic element as in claim 17, wherein the second blind hole has a depth that is at least five times as great as a diameter thereof.

* * * * *